(12) United States Patent
Pederini

(10) Patent No.: US 12,595,779 B2
(45) Date of Patent: Apr. 7, 2026

(54) PLANT FOR THE EXPLOITATION OF RENEWABLE ENERGY SOURCES IN OPEN SEA

(71) Applicant: Enrico Maria Pederini, Quattro Castella (IT)

(72) Inventor: Enrico Maria Pederini, Quattro Castella (IT)

(73) Assignee: ELSIX NEW ENERGIES SRL, Syracuse (IT)

( * ) Notice: Subject to any disclaimer, the term of this patent is extended or adjusted under 35 U.S.C. 154(b) by 0 days.

(21) Appl. No.: 18/862,629

(22) PCT Filed: May 3, 2023

(86) PCT No.: PCT/IB2023/054587
§ 371 (c)(1),
(2) Date: Nov. 4, 2024

(87) PCT Pub. No.: WO2023/214322
PCT Pub. Date: Nov. 9, 2023

(65) Prior Publication Data
US 2025/0283445 A1 Sep. 11, 2025

(30) Foreign Application Priority Data
May 4, 2022 (IT) ........................ 102022000009068

(51) Int. Cl.
*F03B 13/18* (2006.01)
*H01M 50/251* (2021.01)
(52) U.S. Cl.
CPC ....... *F03B 13/1845* (2013.01); *H01M 50/251* (2021.01); *F05B 2240/85* (2020.08)

(58) Field of Classification Search
CPC .............. F03B 13/1845; H01M 50/251; F05B 2240/85
See application file for complete search history.

(56) References Cited

U.S. PATENT DOCUMENTS

2019/0233060 A1 8/2019 Moffat et al.
2021/0190031 A1* 6/2021 Zhang ................... F03B 13/141

FOREIGN PATENT DOCUMENTS

JP 2011089468 A 5/2011
WO 2009034402 A1 3/2009
(Continued)

OTHER PUBLICATIONS

International Search Report and Written Opinion issued on Jul. 18, 2023, in corresponding International Application No. PCT/IB2023/054587, 9 pages.

*Primary Examiner* — Viet P Nguyen
(74) *Attorney, Agent, or Firm* — Maier & Maier, PLLC

(57) ABSTRACT

A plant for the exploitation of renewable energy sources in open sea. The plant includes: a vertical main pillar including a part over sea level and an immersed part; at least one electric generator that produces electric power exploiting renewable energy sources; a battery storage for storing electric power; and an electrical connector that makes available the electric power to an external user. Furthermore, in the plant, the battery storage is inside the main pillar, develops in the immersed part, and comprises a movable structure configured for allowing the movement of batteries along the main pillar.

16 Claims, 4 Drawing Sheets

(56)          References Cited

FOREIGN PATENT DOCUMENTS

| WO | 2011050923 | A2 | 5/2011 | | |
|----|------------|-----|---------|---|---|
| WO | WO-2020264082 | A1 * | 12/2020 | ............ | E21B 47/13 |
| WO | 2021222221 | A1 | 11/2021 | | |

* cited by examiner

PLANT FOR THE EXPLOITATION OF RENEWABLE ENERGY SOURCES IN OPEN SEA

TECHNICAL FIELD

The present invention refers to the sector of plants for the production and the storage of electric power, in particular of offshore plants for the exploitation of renewable energy sources such as wave motion.

BACKGROUND

In the field of renewable electric power production, solutions are known for the exploitation of energy sources available in open sea, in particular wave motion. These plants, usually installed in a position relatively close to the coast, exploit the alternating motion of the waves through buoys or other floating bodies immersed in water. The motion of the buoys, originated by the waves, is transmitted to mechanical members that are configured so as to operate generators suitable for producing electric power.

The plants of this type are connected to the electric power distribution network that develops on mainland. In this way the electric power that is produced by the generators is fed into the network and distributed to the utilities scattered on the mainland.

Such power production plants, albeit appreciated, are not without disadvantages.

First of all, the electric power, in order to be fed into the main distribution network, must be treated in such a way as to meet the parameters imposed by the operator of the network itself, for example in terms of voltage and frequency. This type of treatment of the electric power requires special equipment and inevitably involves the loss of a portion of power.

Even the transport of the power itself implies a dispersion, in particular proportional to the length of the line that must be travelled. For this reason, an attempt is made to minimize the distance between the plant at sea and the main distribution network on the coast.

Lastly, the plants of the known type cannot meet the gradually increasing needs of the electrically powered vessels. Although such plants produce electric power at sea, they are not configured for making it directly available on site. When an electrically powered user vessel has to recharge its batteries, even if it were located near such a plant, it should still reach the nearest port, moor and connect to a special charging column powered by the main distribution network.

The need is therefore felt for a new type of plant for the exploitation of renewable energy sources in open sea.

SUMMARY

The object of the present invention is therefore to overcome the drawbacks highlighted above in relation to the prior art.

In particular, a task of the present invention is to make available a plant for the exploitation of renewable energy sources in open sea that does not necessarily have to be connected to the main distribution network on the mainland.

Furthermore, a task of the present invention is to make available a plant for the exploitation of renewable energy sources in open sea that is not subject to the dispersions related to the treatment and the transport of the electric power produced.

Moreover, a task of the present invention is to make available a plant for the exploitation of renewable energy sources in open sea that can immediately make available the electric power produced.

Lastly, a task of the present invention is to make available a plant for the exploitation of renewable energy sources in open sea which, in addition to introducing further advantages, also maintains the advantages already obtained by the plants of known type.

These and other objects and tasks of the present invention are achieved by a plant in accordance with claim 1. Further characteristics are identified in the dependent claims. All appended claims form an integral part of the present disclosure.

The invention concerns a plant for the exploitation of renewable energy sources in open sea. The plant of the invention comprises:

a main pillar which develops in a substantially vertical direction and which comprises a part over sea level and a immersed part, at least one electric generator configured for producing electric power through exploitation of one or more renewable energy sources, a storage containing batteries configured for storing electric power produced by the electric generator, and an electrical connector configured for making available the electric power stored in the batteries to a user outside the plant.

Furthermore, in the plant of the invention the battery storage is housed inside the pillar and develops at least partially in the immersed part.

This particular structure allows the plant of the invention to exploit the mass of the batteries as ballast, to stabilize the plant as a whole.

The battery storage comprises a movable structure configured for allowing the movement of batteries along the main pillar.

This solution allows to maximize the density of batteries inside the pillar since the possibility of moving the batteries allows not to have to provide passages for the operator, which passages would subtract volume from the batteries themselves.

Preferably the immersed part of the main pillar extends down so as to penetrate the seabed.

In this way the plant of the invention is particularly stable and firm in its position.

Preferably the part over sea level of the main pillar comprises a door configured for allowing entrance of an operator inside the pillar.

The presence of the door allows to protect the interior of the pillar from external environmental agents and, if necessary, to enter inside.

Preferably the battery storage comprises a carousel comprising a plurality of housings connected to one or more chains closed to form a loop.

The carousel represents a structure particularly suitable for the movement of the batteries inside the pillar. In particular, the carousel represents a structure particularly suitable for the movement of the batteries in a vertical direction, from the immersed part to the part over sea level.

In accordance with some embodiments, the battery storage comprises two carousels, which move in respective vertical planes perpendicular to one another. Preferably the battery storage comprises two carousels interpenetrating each other. Even more preferably, the battery storage comprises two carousels interlocking each other.

These solutions allow to further maximize the quantity and the density of batteries housed inside the pillar.

In accordance with some embodiments, the plant comprises a plurality of electric generators that exploit the energy of wave motion.

The exploitation of wave motion allows to generate electric power for very long periods of time compared to other renewable energy sources. In particular, it allows to generate electric power even in the absence of solar irradiation or in the absence of wind.

Preferably each electric generator comprises a buoy constrained on a cable looped around a higher pulley and a lower pulley, and wherein one of the two pulleys is mechanically connected to an alternator or a dynamo.

These electric generators, thanks to their particularly simple structure, are particularly suitable for use on an offshore plant.

Further features, objects and advantages of the present invention will become more evident from the following description.

BRIEF DESCRIPTION OF THE DRAWINGS

The invention will be described below with reference to some examples, provided for explanatory and non-limiting purposes, and illustrated in the accompanying drawings. These drawings illustrate different aspects and embodiments of the present invention and reference numerals illustrating structures, components, materials and/or similar elements in different drawings are indicated by similar reference numerals, where appropriate. Moreover, for clarity of illustration, some references may not be repeated in all figures.

DETAILED DESCRIPTION OF THE EMBODIMENTS

Figure 2:
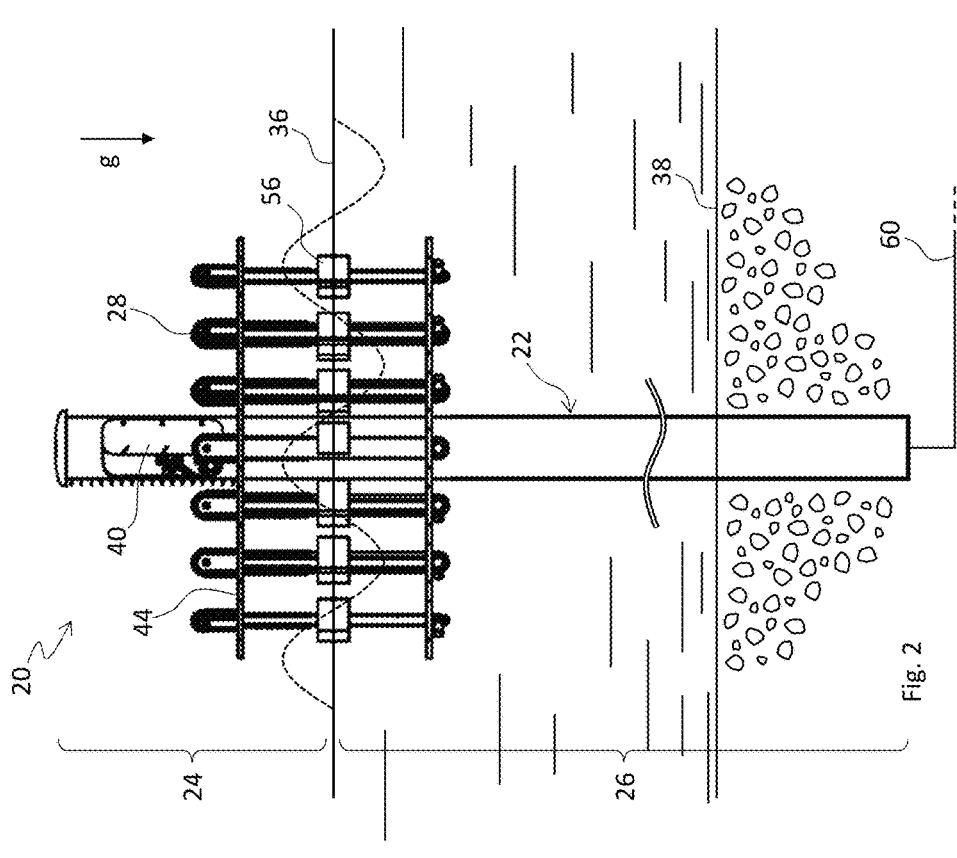
FIG. 2 schematically represents a side elevation view of a plant in accordance with the invention, in a possible off-shore plant.
Figure 1:
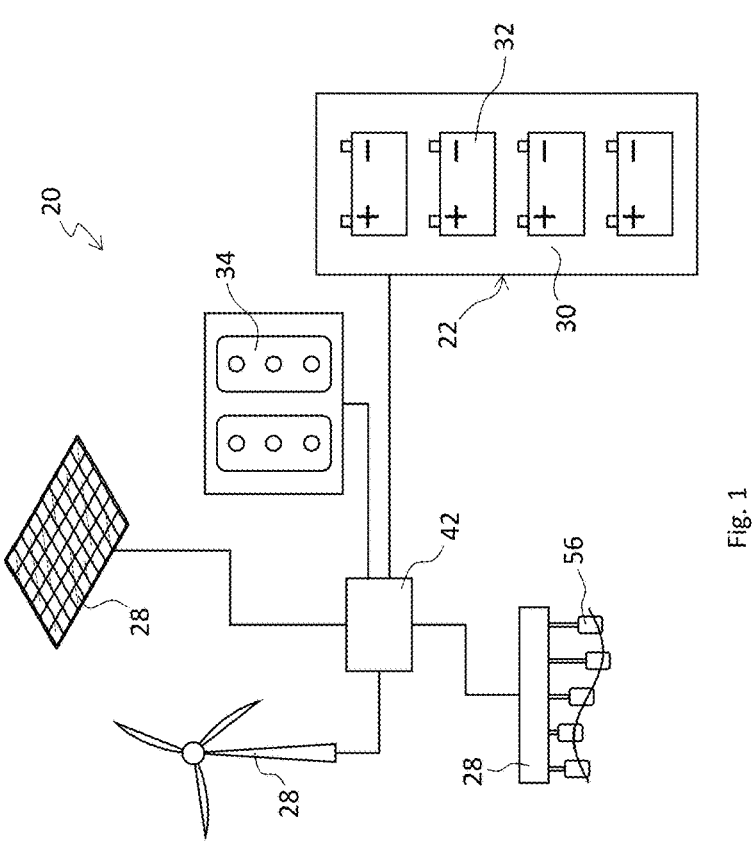
FIG. 1 schematically represents a plant in accordance with the invention.

While the invention is susceptible to various modifications and alternative constructions, certain preferred embodiments are shown in the drawings and are described hereinbelow in detail. It must in any case be understood that there is no intention to limit the invention to the specific embodiment illustrated, but, on the contrary, the invention intends covering all the modifications, alternative and equivalent constructions that fall within the scope of the invention as defined in the claims.

The description deals in detail with the peculiar aspects and the technical features of the invention, while the aspects and the technical features per se known can only be hinted at. In these respects, what is reported above with reference to the prior art remains valid.

The use of "for example", "etc.", "or" indicates non-exclusive alternatives without limitation, unless otherwise indicated. The use of "includes" means "comprises or includes, but not limited to" unless otherwise indicated.

The plant of the invention is intended to operate in the presence of acceleration of gravity g. Based on the acceleration of gravity g, the vertical direction and the horizontal directions are defined unambiguously. Similarly, with respect to the acceleration of gravity g, the terms "high", "upper", "above" and the like are defined with respect to the terms "low", "lower", "below" and the like.

In the following description, the expressions "open sea" or even "off-shore" will be used. These expressions are used for brevity of exposure and should not be construed in a limiting sense. In other words, "open sea" can mean a position in the sea itself or in the ocean, but also in a different body of water such as a lake, a lagoon or a river. Furthermore, these expressions are intended to identify a position in a body of water in which, regardless of the distance from the shore, it is possible for electrically powered vessels to navigate and in which, preferably, a wave motion suitable for the production of energy can be found in the ways described in greater detail below.

The invention relates to a plant 20 for the exploitation of renewable energy sources in open sea, comprising:

- a main pillar 22 which develops in a substantially vertical direction and which comprises, in use, a part 24 over sea level and an immersed part 26,
- at least one electric generator 28 configured for producing electric power through exploitation of one or more renewable energy sources,
- a storage 30 containing batteries 32 configured for storing electric power produced by the electric generator 28, and
- an electrical connector 34 configured for making available the electric power stored in the batteries 32 to a user outside the plant 20, and wherein the battery storage 30 is housed inside the main pillar 22 and develops at least partially in the immersed part 26.

In the plant of the invention, the battery storage 30 comprises a movable structure configured for allowing the movement of the batteries 32 along the main pillar 22.

As mentioned above, the main pillar 22 develops in a substantially vertical direction. In other words, the design orientation provides that the axis of the main pillar 22 is arranged vertically. However, in some embodiments, the main pillar 22 may be at least partially movable about the design position, for example in the floating embodiments described below. In these cases it is therefore possible that in use the axis of the main pillar 22 oscillates around the vertical and that the vertical orientation can be considered as the average position.

Furthermore, the main pillar 22 comprises a part 24 over sea level, i.e. a part which in use rises above the level of the sea 36, and an immersed part 26, which in use is placed below the level of the sea 36.

In accordance with some embodiments, the immersed part 26 of the main pillar 22 extends down so as to penetrate the seabed 38. Preferably the main pillar 22 penetrates the seabed 38 for a length equal to a relevant portion of its overall length, for example for a length greater than about a quarter of its overall length. In this way, the main pillar 22 represents a structure firmly constrained to the ground and can validly counteract the action of currents and/or winds that tend to displace the plant 20 from its predefined position.

In accordance with other embodiments, the main pillar 22 is a floating structure, preferably anchored to the seabed 38 or otherwise constrained so that it can remain in its predefined position and not be displaced by currents or winds.

The distinction between the part 24 over sea level and the immersed part 26 of the main pillar 22 must be considered in an ideal design condition. In fact, as the skilled person can well understand, the level of the sea 36 varies constantly because it is subject to the motion of the waves and the motion of the tides. For this reason the line of demarcation between the part 24 over sea level and the immersed part 26 of the main pillar 22 will vary constantly in use and can only be defined at the time of design, based on the average level of the sea 36 in the position where the main pillar 22 is intended. For example, FIG. 2 schematically shows the mean level of the sea 36 (horizontally) and a design amplitude of the local wave motion (in the form of a sinusoid). The design amplitude of the local wave motion may for example represent the maximum amplitude that is statistically detected in that specific position in a predetermined period of time. However, as the skilled person can well understand, it is possible that, following exceptional events such as anomalous waves, tsunamis or storms of particular intensity, the level of the sea 36 changes significantly. In these cases, especially where the main pillar 22 is of the type anchored to the seabed 38, it is possible that the part 24 over sea level of the main pillar 22 is also temporarily submerged or, vice versa, that the immersed part 26 may emerge at least partially.

Preferably the main pillar 22 has a tubular structure, hollow inside, and closed at the two ends. In particular, the lower end of the main pillar 22, which in use is constantly immersed in water, must be closed in a watertight and definitive manner, for example by welding a bottom. The upper end can instead be closed in such a way as to protect the interior from potentially harmful environmental agents, but can at the same time be configured in such a way as to allow air circulation. By way of example, the upper end may comprise small slits, preferably protected and shielded. Among the potentially harmful environmental agents one must of course consider seawater, but also, depending on the geographical location of the plant 20, rain, hail, saltiness, sand, solar radiation, and so on.

As already mentioned, the battery storage 30 is housed inside the main pillar 22 and develops at least partially in the immersed part 26. Preferably the battery storage 30 develops mainly in the immersed part 26 in such a way as to lower the overall centre of mass of the main pillar 22 and/or of the entire plant 20. Keeping the centre of mass as low as possible, preferably below the level of the sea 36, helps to confer stability to the plant 20.

Preferably the part 24 over sea level of the main pillar 22 comprises a door 40 configured for allowing entrance of an operator inside the main pillar 22, for example for maintenance or check purposes. Preferably the door 40 allows entrance to a maintenance station, for example defined by a landing that constitutes a support inside the main pillar 22.

Preferably, the door 40 is made in accordance with the known techniques adopted in the field of nautical constructions in order to guarantee watertightness over time and thus protect the interior of the main pillar 22 from the environmental agents that could cause damages to the components of the plant 20, such as the battery storage 30 and the electronic unit 42 that controls the operation of the plant 20 itself.

Figure 4:
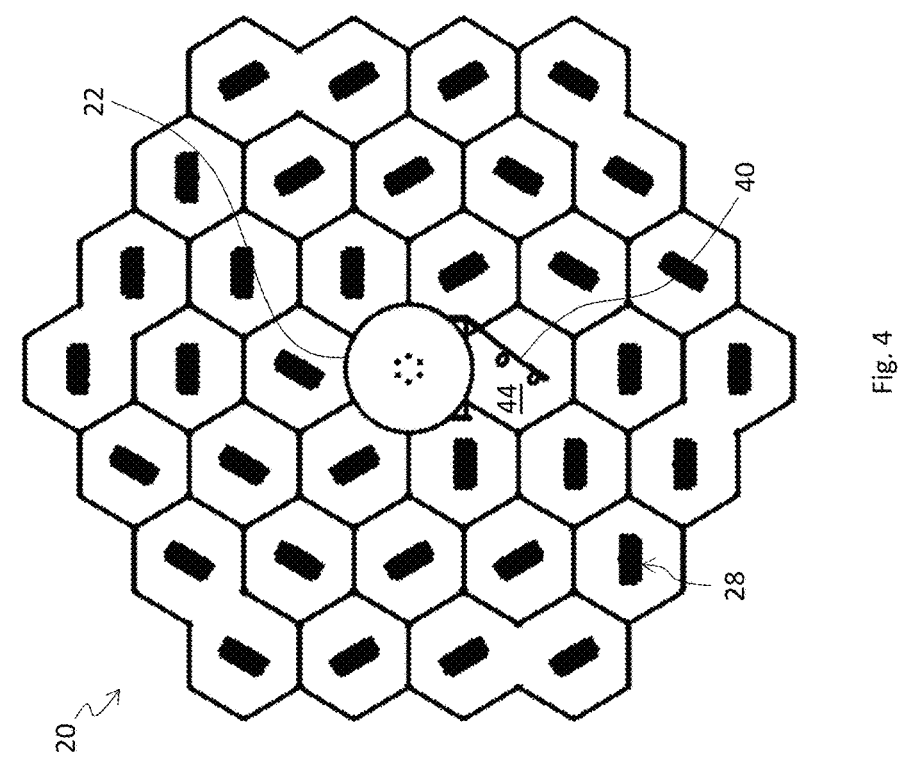
FIG. 4 schematically represents a plan view of the plant of FIG. 2.
Figure 7:
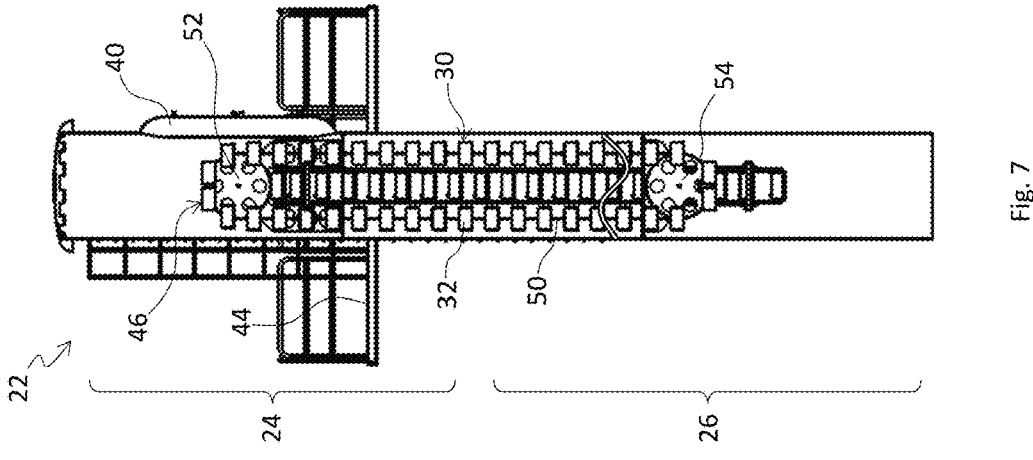
FIG. 7 schematically represents a view of the section operated along line VII-VII of FIG. 6.
Figure 6:
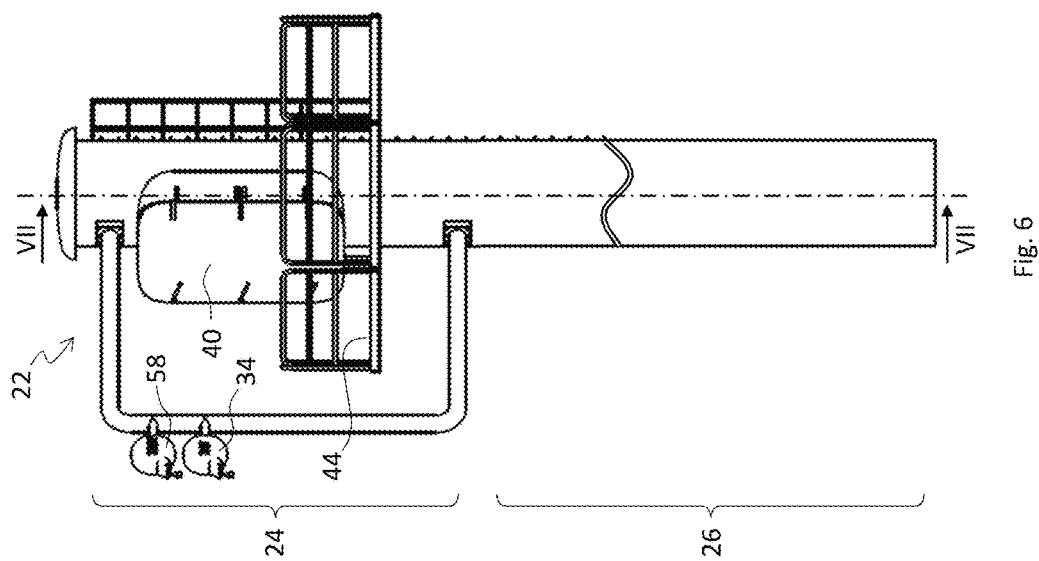
FIG. 6 schematically represents a side elevation view of the pillar of FIG. 5.
Figure 5:
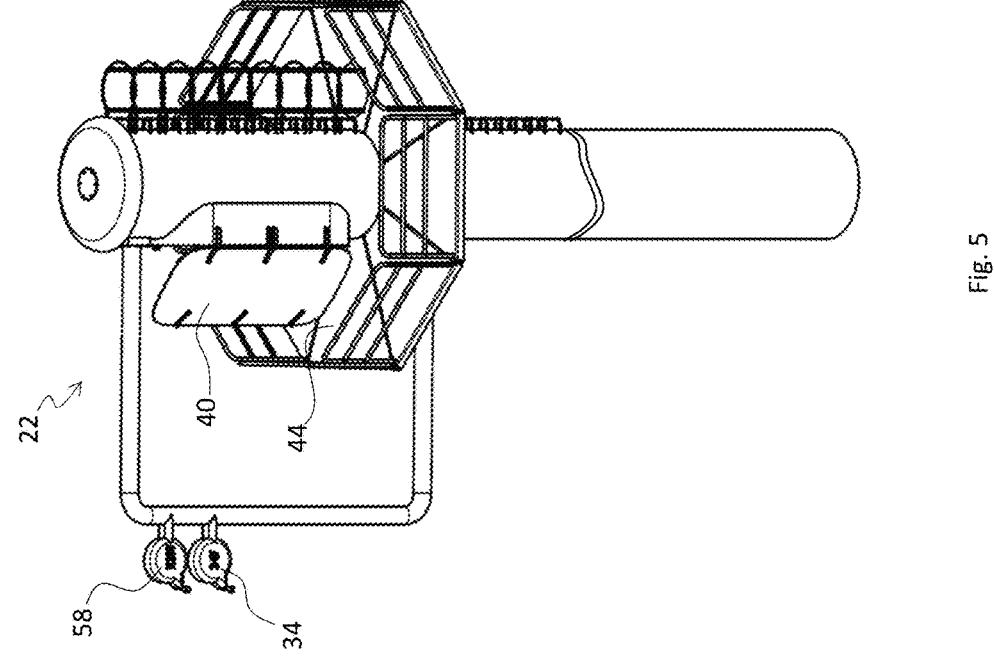
FIG. 5 schematically represents an axonometric view of a main pillar of a plant in accordance with the invention.

In accordance with some embodiments, such as the one of FIGS. 5-7, the main pillar 22 comprises a terrace 44, arranged near the door 40. The presence of the external terrace 44 allows the operator to act more safely and comfortably. In other embodiments, such as the one of FIGS. 2 to 4, the terrace 44 is provided with a structure similar to the one of the electric generators 28 arranged around the main pillar 22.

Preferably, an electronic unit 42, configured for controlling the operation of the plant 20 itself, is also located inside the part 24 over sea level of the main pillar 22. For example, the electronic unit 42 is capable of detecting and managing the flow of input electric power (i.e. the one that flows from the electric generator 28 towards the battery storage 30) and the flow of output electric power (i.e. the one that flows from the battery storage 30 towards the electrical connector 34). The management of such electric power flows may require the provision of circuit elements, known per se, which are configured to modify the characteristics of the electric power, for example to convert direct current into alternating current, or vice versa, and/or to adapt the parameters thereof (such as voltage and frequency) to a design standard. Preferably, the electronic unit 42 is also configured to manage all the other operations necessary or useful for the correct operation of the plant 20, for example to manage communications, possibly automatic ones, with a central unit of the provider of the plant 20, to manage communications with the electrically powered user vessels that wish to connect to recharge their batteries, and so on. Preferably the electronic unit 42 is reachable from the maintenance station.

With regard to the battery storage 30, obtained inside the main pillar 22 and in particular inside its immersed part 26, it is preferable to maximize the density of batteries 32 per unit of volume. For this purpose it is preferable that there are no gaps or passages inside the main pillar 22 such as for example a staircase, a lift or other devices that allow the operator to go along the battery storage 30, which typically allow the operator to move vertically within the main pillar 22. These passages, in fact, having to remain free for the passage of the operator, would subtract useful volume from the batteries 30.

As mentioned above, the battery storage 30 comprises a movable structure configured for allowing the movement of the batteries 32 along the main pillar 22. In this way, the operator, once entered from the door 40, can reach each battery 32 simply by operating the movable structure.

In accordance with preferred embodiments, the movable structure of the battery storage 30 is of the carousel type 46, similar to the one employed in the so-called "paternoster lifts" or in the automatic card file cabinets. In a manner known per se, said carousel structure 46 comprises a plurality of housings 48 connected to one or more chains 50 closed to form a loop. Advantageously each housing 48 contains one or more batteries 32. Although other solutions are possible, in the following description reference is made to the embodiment of the carousel 46 in which two chains 50 are arranged in parallel with each other. In this regard, see in particular FIGS. 8 to 12. This embodiment in fact guarantees to the battery storage 30 greater safety in terms of resistance to the static loads as well as in terms of stability against dynamic stresses.

In accordance with this embodiment, each carousel 46 comprises two chains 50 of equal length, each of which is closed to form a loop and is looped around an own upper sprocket 52 and an own lower sprocket 54. In each carousel 46 therefore there are two upper sprockets 52, identical to each other and having the same axis of rotation X, and two lower sprockets 54, identical to each other and having the same axis of rotation Y. In particular, the axis of rotation X of the upper sprockets 52 is parallel to the axis of rotation Y of the lower sprockets 54 and are both horizontal (see FIGS. 10 and 11).

The two upper sprockets 52 are spaced apart from the two lower sprockets 54 in the vertical direction. In particular, specifically in the invention, the upper sprockets 52 are positioned in the part 24 over sea level of the main pillar 22, for example above the maintenance station, which is accessed via the door 40. Conversely, the lower sprockets 54 are positioned in the immersed part 26. In this way, the two branches, parallel to each other, of the respective chains 50 and on which the housings 48 containing the batteries 32 are constrained, extend vertically between each pair of sprockets (upper 52 and lower 54). Preferably at least one of the sprockets 52, 54 of the carousel 46 is motorized. By imposing the rotation on at least one of the sprockets 52, 54, the movement of the respective chain 50 and, with it, of the entire carousel 46 is obtained. In this way all the housings 48 and the respective batteries 32 can be made to pass in succession through a specific location, for example near the maintenance station. In this way the operator can easily reach every single battery 32 contained in the battery storage 30, for example to check, fix or replace it.

Preferably, again in order to maximize the density of batteries 32 per unit of volume inside the main pillar 22, it is preferable that the housings 48 and the respective batteries 32 are evenly distributed along the entire length of the carousel 46. In this way it is also obtained that, during the movement of the carousel 46, while half of the batteries 32 must be lifted upwards, overcoming the force of gravity, the other half is lowered downwards, exploiting the force of gravity. For this reason, the power required to move the carousel 46 is reduced to a minimum and is essentially the one necessary to overcome frictions.

As the skilled person can well understand, the movement of the carousel 46 described above can be considered substantially comprised in a plane, in particular in the vertical plane perpendicular to the axes of rotation X and Y of the sprockets 52, 54.

Preferably, still in order to maximize the density of batteries 32 in the main pillar 22, the battery storage 30 comprises two carousels 46' and 46" which move in respective vertical planes perpendicular to one another. In other words, the battery storage 30 comprises two carousels 46' and 46" of the type described above, wherein the projections on a horizontal plane of the axes of rotation X', Y' and X", Y" of the sprockets of the two carousels 46' and 46" are perpendicular to one another (see in particular FIG. 12).

Even more preferably, the battery storage 30 comprises two carousels 46' and 46" interpenetrating each other. In other words, the battery storage 30 comprises two carousels 46 of the type described above, wherein the upper sprockets 52' of a first carousel 46' are placed higher than the upper sprockets 52" of the second carousel 46", and the upper sprockets 52" of the second carousel 46" are comprised between the vertical branches of the chains 50' of the first carousel 46' (see in particular FIG. 9).

Even more preferably, the battery storage 30 comprises two carousels 46' and 46" interlocking each other. In other words, the battery storage 30 comprises two carousels 46 of the type described above which interpenetrate each other, and in which the lower sprockets 54' of the first carousel 46' are placed higher than the lower sprockets 54" of the second carousel 46" and the lower sprockets 54' of the first carousel 46' are comprised between the vertical branches of the chains 50" of the second carousel 46" (see FIGS. 10 and 11).

Figures 8, 9, 10, 11, 12:
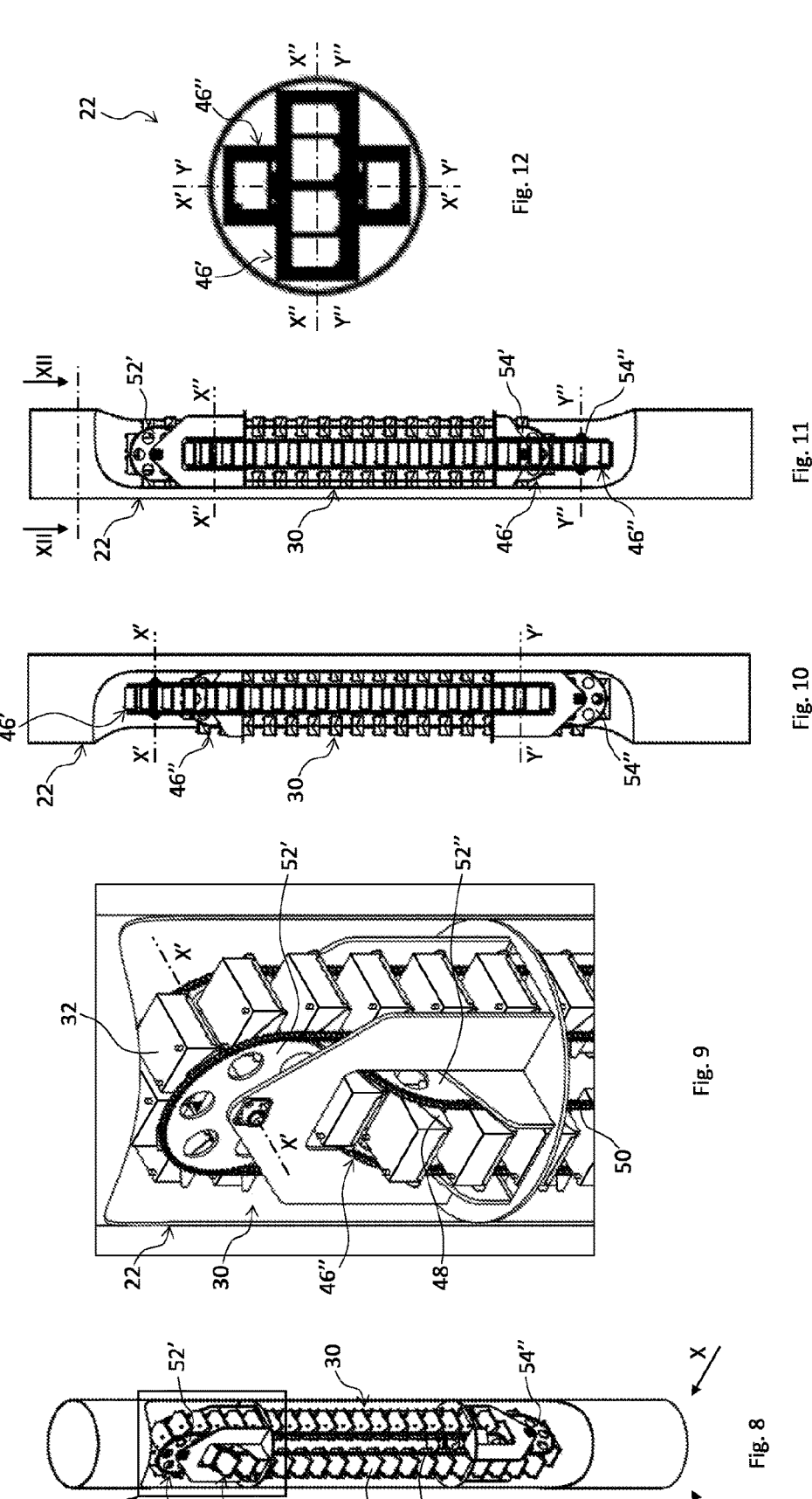
FIG. 8 schematically represents an axonometric view of a main pillar of another plant in accordance with the invention, wherein a part of the wall has been removed to show the interior.
FIG. 9 represents an enlarged view of the detail indicated with IX in FIG. 8.
FIG. 10 represents a side elevation view of the pillar of FIG. 8, seen from the direction indicated with X.
FIG. 11 represents a side elevation view of the pillar of FIG. 8, seen from the direction indicated with XI.
FIG. 12 schematically represents a view of the section operated along line XII-XII of FIG. 11.

Furthermore, in this type of structure, the chains 50' of the first carousel 46' go through the loop formed by the chains 50" of the second carousel 46", and vice versa, the chains 50" of the second carousel 46" go through the loop formed by the chains 50' of the first carousel 46' (see FIGS. 8 and 10-11).

As the skilled person can well understand, the batteries 32 are preferably electrically connected to each other so as to constitute a single electrical entity with respect to an external circuit element. The connection scheme of the batteries 32 can be defined based on the specific needs, for example in terms of voltage or intensity of current.

As mentioned, the plant 20 of the invention comprises at least one electric generator 28 configured for producing electric power through exploitation of one or more renewable sources. The plant 20 may therefore comprise one or more electric generators 28 chosen, also jointly, from among the generators that exploit the energy of the wind, of the sun of the tidal motion or of the wave motion.

Preferably the plant 20 of the invention comprises a plurality of electric generators 28 that exploit the energy of wave motion. Even more preferably, the plant 20 of the invention comprises a plurality of generators of the type comprising a buoy 56 constrained to move vertically to follow the wave motion, in particular the buoy 56 is constrained to perform a vertical oscillatory motion between a lower dead point (at the wave trough) and an upper dead point (at the wave crest). Each electric generator 28 uses the vertical motion of its buoy 56 to generate electric power. The presence of a plurality of electric generators 28, also thanks to the spatial dispersion of the buoys 56, allows to have an almost continuous production of electric power, because the movement of the buoys 56 is staggered. In other words, while a buoy 56 is temporarily stationary at one of the two dead points (lower or upper), and thus the respective electric generator 28 is inactive, it is statistically certain that at least another buoy 56 is moving and that therefore the relative electric generator 28 is active.

Figure 3:
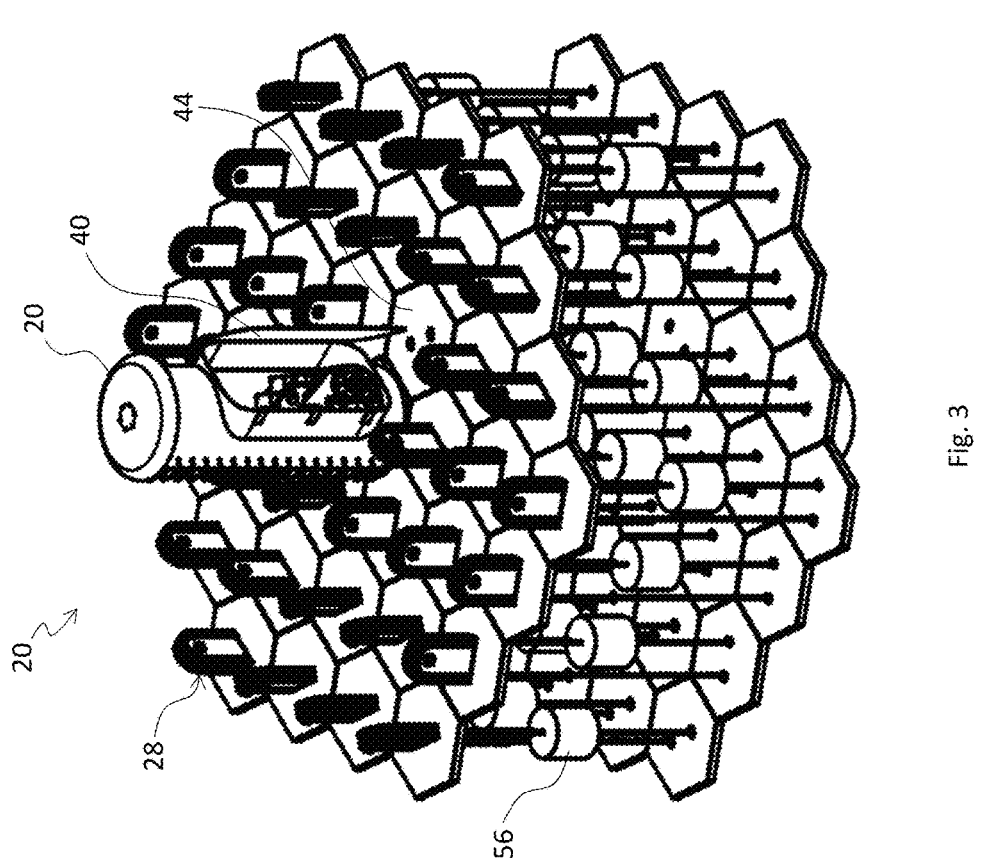
FIG. 3 schematically represents an axonometric view of the plant of FIG. 2.

Preferably, the plant 20 of the invention comprises a plurality of electric generators 28 that exploit the energy of wave motion of the type schematically represented in FIGS. 2 to 4. In such an embodiment, each electric generator 28 comprises a buoy 56 constrained on a cable (or possibly a chain or a belt, depending on the embodiments), looped around a higher pulley and a lower pulley. As can be seen particularly well in FIG. 2, such a structure of the electric generator 28 extends astride the design wave motion, such that under normal conditions the alternating motion of the buoy 56 generated by the wave motion remains within the respective limits. The alternating motion of vertical translation of the buoy 56 is transformed into an alternating motion of rotation of the pulleys. One of the two pulleys, preferably the upper one, placed above the level of the sea 36, is mechanically connected to an alternator or a dynamo.

As already mentioned, the plant 20 of the invention comprises at least one electrical connector 34 configured for making available the electric power stored in the batteries 32 to a user outside the plant 20. The electrical connector 34 may preferably be a socket made in accordance with a standard adopted in the field of charging electrically powered user vessels. For example, the electrical connector 34 may make available electric power in the form of 24 V direct current, particularly suitable for recharging batteries of electrically powered user vessels.

The electrical connector 34 is preferably arranged near the plant 20. In some embodiments, such as for example the one of FIGS. 5 to 7, the electrical connector 34 is arranged near the main pillar 22, for example on the terrace 44. In this way the operator can act comfortably and safely also to proceed with the connection for recharging the user vessel. In other embodiments, for example the one of FIGS. 2 to 4 in which the main pillar 22 is surrounded by electric generators 28, the electrical connector 34 is preferably placed near the periphery of the plant 20, so as to be easily reachable by the user vessel. The electrical connector 34 may for example be positioned on an own buoy or on a secondary pillar (not shown).

Preferably the plant 20 may also comprise a second electrical connector 58, also configured for making available the electric power stored in the batteries 32. Advantageously, the second electrical connector 58 can make available electric power in the form of alternating current like the one provided by the main distribution network (for example, for the European market, at 220 V and 50 Hz) which is particularly suitable for the power supply of tools and implements for the maintenance of the plant 20 itself.

In accordance with some embodiments, the plant 20 of the invention may also comprise an electrical connection 60 with the main distribution network on the mainland. This solution can make it possible to exploit any amount of energy that should exceed the needs related to recharging user vessels in open sea.

As the skilled person can well understand, the invention overcomes the drawbacks highlighted above in relation to the prior art.

In particular, the invention makes available a plant 20 for the exploitation of renewable energy sources in open sea that does not necessarily have to be connected to the main distribution network on the mainland. In particular, the invention makes it possible to obtain a plant 20 that produces power and makes it available directly on site, where it is particularly useful for electrically powered vessels. In this way it is in fact possible to recharge the batteries 32 directly in open sea, with no need to enter the port.

In addition, the invention makes available a plant 20 for the exploitation of renewable energy sources in open sea that is not subject to the dispersions related to the treatment and the transport of the electric power produced. The plant 20 of the invention is in fact sized to produce power and make available almost all of it directly on site, without any need to transmit it remotely. The energy possibly fed into the network, then transmitted remotely, would still represent a minority amount.

Moreover, the invention makes available a plant 20 for the exploitation of renewable energy sources in open sea that can immediately make available the electric power produced.

Lastly, the invention makes available a plant 20 for the exploitation of renewable energy sources in open sea which, in addition to introducing further advantages, also maintains the advantages already obtained from the plants of known type.

In conclusion, all the details can be replaced by other technically equivalent elements; the features described in relation to a specific embodiment can also be used in the other embodiments; the materials used, as well as the contingent shapes and dimensions, can be any according to the specific implementation needs without leaving the scope of protection of the following claims.

The invention claimed is:

1. A plant for the exploitation of renewable energy sources in open sea, comprising:
   a main pillar which develops in a substantially vertical direction and which comprises a part over sea level and an immersed part,
   at least one electric generator configured for producing electric power through exploitation of one or more renewable energy sources,
   a storage containing batteries configured for storing electric power produced by the electric generator, wherein the battery storage is housed inside the main pillar and develops at least partially in the immersed part, and
   an electrical connector configured for making available to a user outside the plant the electric power stored in the batteries,
   wherein the battery storage comprises a movable structure configured for allowing the movement of batteries along the main pillar, and
   wherein the battery storage comprises a carousel comprising a plurality of housings connected to one or more chains closed to form a loop.

2. The plant according to claim 1, wherein the immersed part of the main pillar extends down so as to penetrate the seabed.

3. The plant according to claim 1, wherein the part over sea level of the main pillar comprises a door configured for allowing entrance of an operator inside the main pillar.

4. The plant according to claim 1, wherein the battery storage comprises two carousels, which move in respective vertical planes perpendicular to one another.

5. The plant according to claim 4, wherein the battery storage comprises two carousels interpenetrating each other.

6. The plant according to claim 5, wherein the second electrical connector makes available electric power in the form of alternating current.

7. The plant according to claim 4, wherein the battery storage comprises two carousels interlocking each other.

8. The plant according to claim 4, further comprising a second electrical connector configured for making available the electric power stored in the batteries.

9. The plant according to claim 1, comprising a plurality of electric generators exploiting energy of wave motion.

10. The plant according to claim 9, wherein each electric generator comprises a buoy constrained on a cable looped around a higher pulley and a lower pulley, and wherein one of the two pulleys is mechanically connected to an alternator or a dynamo.

11. The plant according to claim 1, wherein the electrical connector (makes available electric power in the form of 24 V direct current.

12. The plant according to claim 1, further comprising a second electrical connector configured for making available the electric power stored in the batteries.

13. The plant according to claim 12, wherein the second electrical connector makes available electric power in the form of alternating current.

14. A plant for the exploitation of renewable energy sources in open sea, comprising:

a main pillar which develops in a substantially vertical direction and which comprises a part over sea level and an immersed part, at least one electric generator configured for producing electric power through exploitation of one or more renewable energy sources, a storage containing batteries configured for storing electric power produced by the electric generator, wherein the battery storage is housed inside the main pillar and develops at least partially in the immersed part, and an electrical connector configured for making available to a user outside the plant the electric power stored in the batteries, wherein the battery storage comprises a movable structure configured for allowing the movement of batteries along the main pillar, wherein the immersed part of the main pillar extends down so as to penetrate the seabed, wherein the part over sea level of the main pillar comprises a door configured for allowing entrance of an operator inside the main pillar, and wherein the battery storage comprises a carousel comprising a plurality of housings connected to one or more chains closed to form a loop.

15. The plant according to claim 14, wherein the battery storage comprises two carousels, which move in respective vertical planes perpendicular to one another.

16. The plant according to claim 15, wherein the battery storage comprises two carousels interpenetrating each other.

* * * * *